United States Patent
Killadi et al.

(10) Patent No.: US 10,652,097 B2
(45) Date of Patent: May 12, 2020

(54) VIRTUAL NETWORK PROBING

(71) Applicant: Hewlett Packard Enterprise Development LP, Houston, TX (US)

(72) Inventors: Srinivas Killadi, Bangalore (IN); Sree Vasthav Shatdarshanam Venkata, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/941,301

(22) Filed: Mar. 30, 2018

(65) Prior Publication Data
US 2019/0306027 A1    Oct. 3, 2019

(51) Int. Cl.
*H04L 12/24* (2006.01)
*H04L 12/46* (2006.01)

(52) U.S. Cl.
CPC .......... *H04L 41/12* (2013.01); *H04L 12/4641* (2013.01)

(58) Field of Classification Search
CPC ..... H04L 41/12; H04L 12/4641; H04L 12/42; H04L 41/0806
See application file for complete search history.

(56) References Cited

U.S. PATENT DOCUMENTS

| 7,848,337 B1 * | 12/2010 | Weng ................. H04L 12/4679 370/389 |
| 7,920,518 B2 | 4/2011 | Thompson et al. |
| 8,064,927 B2 | 11/2011 | Hsu et al. |
| 8,488,576 B2 | 7/2013 | Kezys et al. |
| 2008/0002607 A1 | 1/2008 | Nagarajan |
| 2015/0319042 A1 * | 11/2015 | PalChaudhuri ..... H04L 41/0873 370/395.53 |
| 2016/0330077 A1 | 11/2016 | Jin et al. |
| 2017/0013441 A1 * | 1/2017 | Manik ................... H04W 8/183 |
| 2017/0027004 A1 * | 1/2017 | Lu .......................... H04W 12/06 |

OTHER PUBLICATIONS

Multi-SSID Deployment Considerations (Web Page), Retrieved Aug. 17, 2017, 2 Pgs.

* cited by examiner

*Primary Examiner* — Shukri Taha
(74) *Attorney, Agent, or Firm* — Jaffery Watson Mendonsa & Hamilton (57) ABSTRACT

A method is disclosed. The method may comprise identifying a plurality of network devices in a cluster of network devices. In some examples, the method may comprise identifying any virtual local area networks (VLANs) that are enabled on each of the plurality of network devices in the cluster of network devices. In some examples, the method may comprise, for each identified VLAN, determine a set of network devices accessible on a respective VLAN. In some examples, the method may comprise probing the respective VLAN in response to the respective VLAN being accessible by each network device in the cluster of network devices. A network device and a machine-readable medium are also disclosed.

12 Claims, 5 Drawing Sheets

VIRTUAL NETWORK PROBING

BACKGROUND

In a networking environment, a client device may be connected to an access point (AP) or a virtual access point (VAP) within a network. The AP or VAP may be connected to and managed by a network controller, which may be a part of a network controller cluster. If a network controller were to fail, then a client device managed by the failed network controller can automatically be managed by a backup network controller within the network controller cluster. This process may be referred to as a failover.

BRIEF DESCRIPTION OF DRAWINGS

Examples will now be described, by way of non-limiting example, with reference to the accompanying drawings, in which.

DETAILED DESCRIPTION

Within a computing network, client devices may connect to an access point (AP) or to a virtual access point (VAP). In this context, a virtual access point may generally refer to a non-physical, secondary access point created by a physical, first access point that advertises a unique service set identifier (SSID), which can be referred to as a virtual SSID. A physical access point may create multiple VAPs, each of which may advertise a unique virtual SSID. Multiple devices may be associated with each VAP of the physical access point. A user may connect to the network by associating a client device, such as a desktop computer, laptop computer, tablet computer, smartphone, and the like, with an access point (or virtual access point) in the network.

Each VAP may be managed by a network controller. A network controller may generally refer to a computing device that is capable of managing a plurality of access points and client devices in a networking environment. For example, a network controller may manage multiple VAPs and/or APs. The network controller may be a part of a network controller cluster. A network controller cluster may include a plurality of network controllers. In some examples, a network controller cluster may include between two and twelve network controllers. For example, a network controller cluster may be formed of four network controllers connected to one another. Within a network controller cluster, each network controller may be assigned to a different network controller and serve as a backup (or redundant) network controller for the different network controller within the network controller cluster. In the event that a network controller were to fail (e.g. if power to the network controller were to be cut), then any client devices connected to the network and managed by the failed network controller would automatically be managed by its backup network controller, without the client device experiencing any loss in service. The process of the backup network controller taking over from the failed network controller may generally be referred to as failover. Thus, the network controller cluster may be referred to as a failover cluster.

Figure 1:
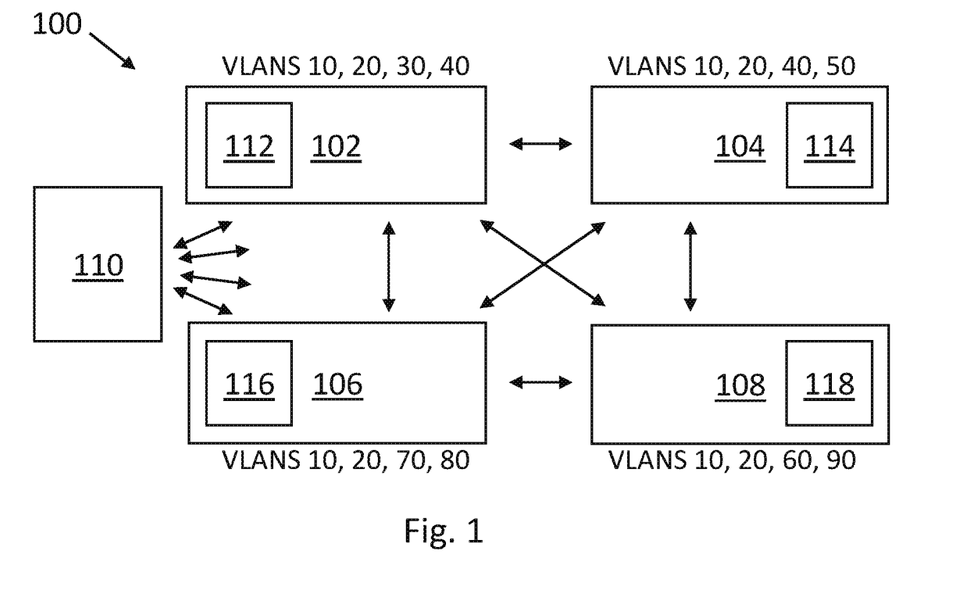
FIG. 1 is a schematic representation of an example of a cluster of network controllers.

Referring to the drawings, FIG. 1 is a schematic representation of a networking environment 100. The network environment 100 includes a first network controller 102, a second network controller 104, a third network controller 106 and a fourth network controller 108, which may form a network controller cluster. The network controllers 102, 104, 106, 108 may be referred to as managed devices because they may transmit management frames to other devices in the network environment 100. In the example shown in FIG. 1, the network controllers 102, 104, 106, 108 are in communication with, and may be controlled by, a master controller 110, which is also a part of the network controller cluster. The master controller 110 may, in some examples, be referred to as a mobility master. The master controller 110 may send configuration settings and data to each of the network controllers 102, 104, 106, 108 in the cluster, and may monitor each network controller so that configuration settings of a network controller may updated. Such configuration settings may include, for example, details of networks which are enabled on each network controller.

In a network controller cluster, multiple virtual local area networks (VLANs) or other types of networks may be enabled on each network controller. In other words, a client device connected (e.g. via a VAP with which the client device is associated) to a network controller may be connected to a VLAN. Some VLANs may be enabled on just one network controller, while other VLANs may be enabled on multiple network controllers. In the example of FIG. 1, VLANs 10, 20, 30 and 40 are enabled on the first network controller 102; VLANs 10, 20, 40 and 50 are enabled on the second network controller 104; VLANs 10, 20, 70 and 80 are enabled on the third network controller 106; VLANs 10, 20, 60 and 90 are enabled on the fourth network controller 108. Therefore, while the VLANs 10 and 20 are enabled on all four network controllers in the cluster, the VLANs 30, 40, 50, 60, 70, 80 and 90 are enabled on just one or two of the network controllers (i.e. they are not enabled on all of the network controllers in the cluster).

In this example, the VLANs 10 and 20 may be considered to be "user VLANs", which are VLANs designated to transmit user traffics, or traffic to and from a plurality of client devices. The VLANs 30, 40, 50, 60, 70, 80 and 90 may be considered to be "non-user VLANs", which are VLANs designated to transmit management frames, e.g., control frames between the access point and network controllers in the network environment 100. The non-user VLANs may be used for some other purpose, such as for enabling communications between multiple network controllers in a network controller cluster. For example, the first network controller 102 and the second network controller 104 may communicate with one another via the VLAN 40. Each VLAN may have a unique identifier, referred to as an extended service set identification (ESSID). Therefore, a first ESSID, for example ESSID1, may be assigned with the VLAN 10. The identifier ESSID1 may, for example, be called "alpha-wpa2". A second ESSID, for example ESSID2, may be assigned with the VLAN 20. The identifier ESSID2 may, for example, be called "alpha-voip". The master controller 110 may transmit the ESSID of each VLAN to the particular network controller(s) in the network controller cluster for which the VLAN is enabled. Thus, since ESSID1 and ESSID2 relate to user VLANs which are enabled on all of the network controllers 102, 104, 106, 108 in the network controller cluster, the master controller 110 may push details of the ESSID1 network (e.g., VLAN 10) and the ESSID2 network (e.g., VLAN 20) to all of the network controllers 102-108 in the network controller cluster.

The network controllers within the network controller cluster may be connected to one another according to a layer of the 7-layer Open Systems Interconnection (OSI) model of computer networking. In some examples, the network controllers may be connected via a data link layer, which may be referred to as layer 2 (or L2). Within the data link layer, data may be transferred between adjacent network nodes in the same wide area network (WAN) or between nodes in the same local area network (LAN) or VLAN. In other examples, the network controllers may be connected via a network layer, which may be referred to as layer 3 (or L3). Within the network layer, data may be transferred between nodes in the same network, or in different networks, using variable-length network packets, which are routed through routers. Functionalities of the network controllers and, consequently, functionality of client devices connected via APs or VAPs to the network controllers may depend upon the manner in which the network controllers are connected (e.g. via layer 2 or layer 3). In order to determine how the network controllers in the network controller cluster are connected, the network controllers may probe each other in the network controller cluster in order to determine a set of network controllers that are visible and accessible to a particular network controller in the network controller cluster on each VLAN. For example, in the network environment 100 shown in FIG. 1, the first network controller 102 may probe the second network controller 104, third network controller 106 and the fourth network controller 108 on a particular VLAN (e.g. VLAN 10) to determine whether or not the second, third and fourth network controllers are visible and accessible to the first network controller via VLAN 10.

Probing, in the context of this disclosure, involves sending a data packet from a transmitting device (e.g. first network controller 102) to a receiving device (e.g. the second network controller 104). If the receiving device is visible and accessible to the transmitting device, then the receiving device will respond to the transmitting device with a response data packet. Receipt of the response data packet by the transmitting device serves as a confirmation that the receiving device is accessible to the transmitting device on the particular VLAN (e.g. VLAN 10) on which the data packet was transmitted and received.

Within the network controller cluster, secure connections are established between each of the network controllers 102, 104, 106, 108, via which data (e.g. the data packets) may be transmitted. The connections may, in some examples, be referred to as secure tunnels. In FIG. 1, the secure connections are denoted by double-headed arrows between the network controllers.

According to examples disclosed herein, each network controller 102, 104, 106, 108 can perform an intelligent probing process, whereby a network controller may probe another network controller in the network controller cluster if the same non-user VLAN is enabled on both network controllers. Similarly, a network controller may not probe another network controller in the network controller cluster if there is no common non-user VLAN enabled on both network controllers. Accordingly, each network controller in the network controller cluster may include a probing management mechanism. In the example shown in FIG. 1, the first network controller 102 includes a first probing management mechanism 112, the second network controller 104 includes a second probing management mechanism 114, the third network controller 106 includes a third probing management mechanism 116 and the fourth network controller 108 includes a fourth probing management mechanism 118. The functions performed by each probing management mechanism are discussed below.

Figure 2:
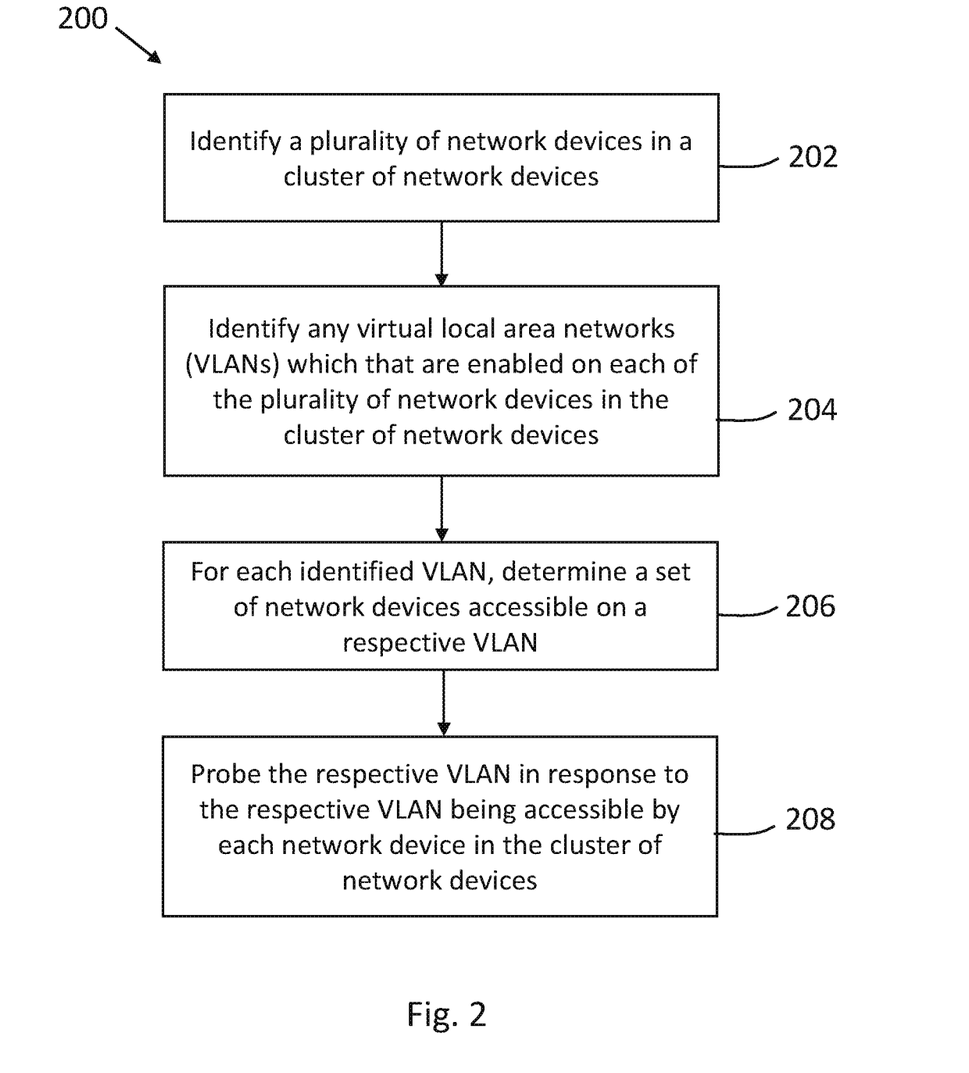
FIG. 2 is a flowchart of an example of a method of probing network controllers.

FIG. 2 is a flowchart of an example of a method 200. In some examples, the method may be considered to be a method of probing network devices, or probing VLANs. For example, the devices to be probed may comprise network controllers such as the network controllers 102, 104, 106, 108, which may form part of a network controller cluster. The method 200 comprises, at block 202, identifying a plurality of network devices in a cluster of network devices. The identifying (block 102) may be performed at each network controller 102, 104, 106, 108. In some examples, the master controller 110 may inform each network controller of the identity of each other network controller within a cluster. Thus, identifying the plurality of network devices (block 202) may, in some examples, comprise receiving at each network device in the plurality of network devices, configuration settings from a cluster management device, such as the master controller 110. In some examples, each network controller may perform a data packet exchange with each other accessible network controller so that each network controller can determine which other network controllers are part of the same network controller cluster. For example, with reference to the example shown in FIG. 1, the first network controller 102 may send a data packet to the second, third and fourth network controllers 104, 106, 108. If a response is received by the first network controller 102 from another network controller, then the first network controller may determine that each responding network controller is part of the same cluster. The exchange of data packets may be referred to as a "cluster hello".

Once a cluster has been established between a set of network devices (e.g. network controllers), the state of connectedness may be set as layer 3 (i.e. network layer) connectivity. Within the network layer, data may be transferred between nodes or devices (e.g. network controllers) in the same network, or in different networks, using variable-length network packets, which are routed through routers. In some examples, layer 3 connectivity may be regarded as the default state, until it is determined that the cluster is in fact connected according to some other state (e.g. layer 2 connectivity). Layer 2 (or L2) describes the connectivity of devices (e.g. network controllers) connected via the data link layer. Within the data link layer, data may be transferred between adjacent network nodes in the same wide area network (WAN) or between nodes in the same local area network (LAN) or VLAN.

At block 204, the method 200 comprises identifying any virtual local area networks (VLANs) that are enabled on each of the plurality of network devices in the cluster of network devices. The identifying performed at block 204 may be performed by each network device (e.g. network controller) in the cluster of network devices. In some examples, a network device may determine which, if any, virtual networks (e.g. VLANs) are enabled on it and all other network devices in the cluster of network devices from the data packet exchange performed at block 202. In some examples, a network device may be able to determine which, if any, virtual networks are enabled on all of the network devices in the cluster based on information (e.g. configuration settings) provided by a master network device (e.g, the master controller 110 of FIG. 1). For example, when configuration settings regarding VAPs (i.e. VAP configuration settings) are sent to the network controllers in a cluster, the same VAP configuration settings are sent to all of the network controllers. The VAP configuration settings include details of the VLANs enabled on the VAPs, so each of the network controllers in the cluster is able to know which virtual networks (e.g. VLANs) are enabled on all of the network controllers in the cluster.

Referring to the example shown in FIG. 1, the first network controller 102 may receive from the master controller 110 configuration settings indicating that the first network controller is enabled with VLANs 10, 20, 30 and 40. The first network controller 102 may also receive from the master controller 110 indication that the second network controller 104, the third network controller 106 and the fourth network controller 108 are also enabled with VLANs 10, and 20.

In some examples, the VLANs which are determined to be enabled on all of the network controllers in a network controller cluster may be added to a probing list. The probing list may comprise a computer-readable file, such as a text file or an xml file, and may include a list of VLANs to be probed.

The method 200 comprises, at block 206, for each identified VLAN, determine a set of network devices accessible on a respective VLAN. Thus, the method determines which network devices are accessible on a particular VLAN. At block 208, the method 200 comprises probing the respective VLAN in response to the respective VLAN being accessible by each network device in the cluster of network devices. Thus, each network device in the cluster may probe each other network device in the cluster on those virtual networks which are enabled on all of the network devices in the cluster. In other words, probing is not performed on any VLANs that are not enabled on all of the network devices in the cluster. Probing may be performed using probing techniques discussed herein. For example, in some examples, the virtual network probing (e.g. at block 208) may comprise, on each identified virtual network, transmitting a data packet from a first network device in the cluster of network devices to each other network device in the cluster of network devices, and receiving a response from those network devices in the cluster of network devices on which the respective VLAN is enabled. The first network device may repeat transmission and receipt of a data packet on each VLAN.

Referring again to the example shown in FIG. 1, each of the network controllers 102, 104, 106, 108 in the cluster identifies (at block 204) the virtual networks VLAN 10 and VLAN 20 as being enabled on all of the network controllers in the cluster and, therefore, probing of each network controller (at block 208) is performed just on the VLANs 10 and 20; probing is not performed on the VLANs 30, 40, 50, 60, 70, 80 or 90 as not all of the network controllers in the cluster are enabled with those VLANs.

By probing the network devices in respect of just those virtual networks enabled on all of the network devices in a cluster, rather than probing the network devices in respect of virtual networks enabled on just a subset of the network devices in the cluster, the probing is focused on the user VLANs (i.e. those VLANs on which user traffics are transmitted to or from client devices) rather than the non-user VLANs which may be used for purposes not involving client devices (e.g. transmitting network management frames). In this way, the addition of a virtual network (e.g. a new VLAN, not shown) which is enabled on just one of the network devices in the cluster would not affect the probing; network devices would not be probed on the new VLAN as the new VLAN is not enabled on all of the network devices in the cluster. Further consequences are apparent from the discussion below.

According to some examples, a further example of a method of probing network devices may comprise identifying a plurality of network devices in a cluster of network devices; then, for each network device in the cluster of network devices, identifying any virtual networks enabled on the network device, determining whether an access point is accessible on each identified virtual network, and upon determining that an access point is accessible on a particular identified virtual network and that the particular identified virtual network is enabled on each network device in the network device cluster, assigning the particular identified virtual network to a probing list. The method may further comprise performing virtual network probing of each network device in the cluster of network devices in respect of those virtual networks assigned to the probing list so as to determine whether or not each network device is accessible on each virtual network assigned to the probing list.

Figure 3:
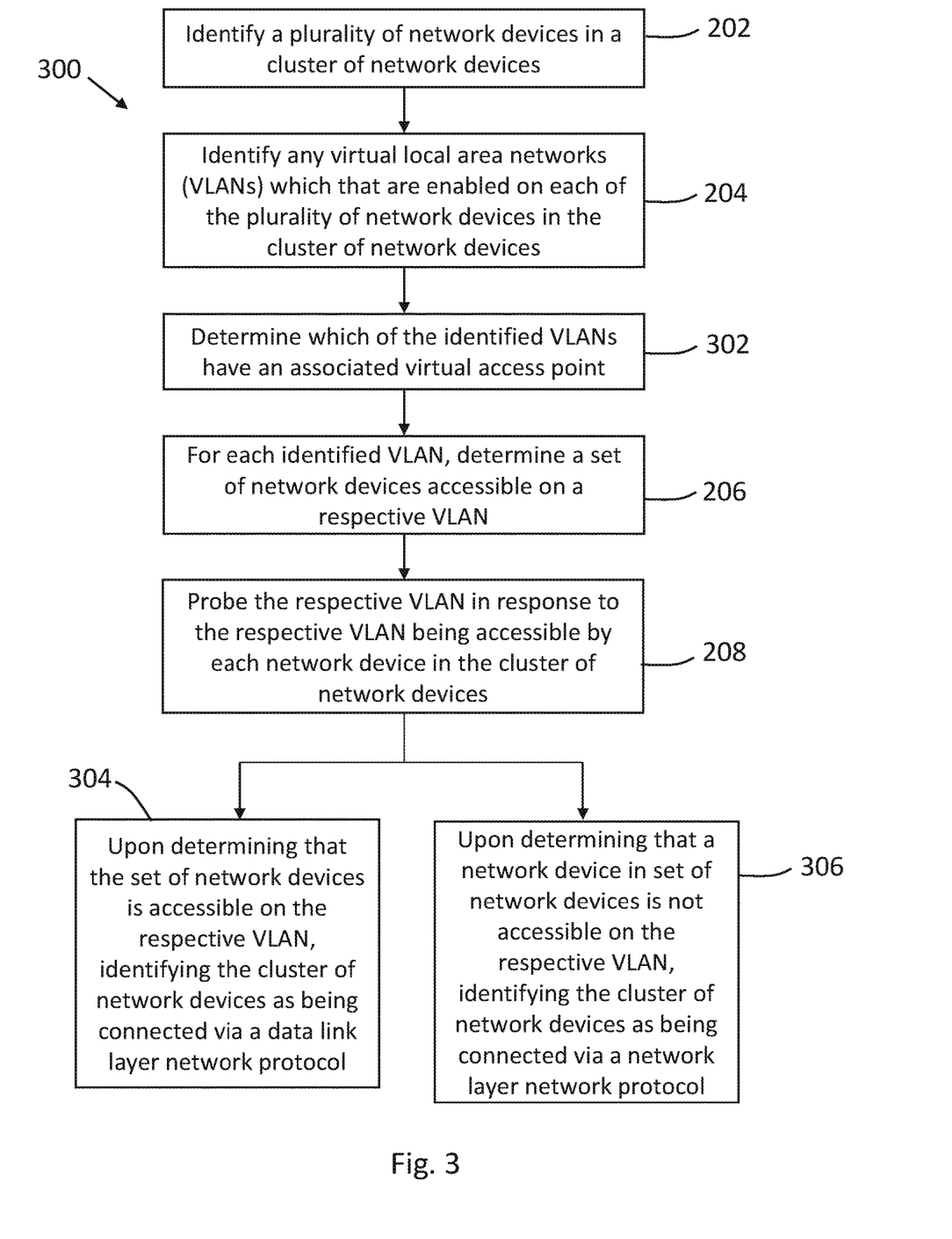
FIG. 3 is a flowchart of a further example of a method probing network controllers.

FIG. 3 is a flowchart of a further example of a method 300. The method 300 may be considered to be a method of probing devices, such as network devices or network controllers. The method 300 may include blocks of the method 200 discussed above. In some examples, the method 300 may further comprise, at block 302, determining which of the identified VLANs have an accessible virtual access point. The determining of block 302 may be performed prior to the probing of block 208, such that the probing of block 208 is based on the determining of block 302. As noted above, a virtual access point (VAP) may be managed by a network device (e.g. a network controller 102, 104, 106, 108) via or within a virtual network (e.g. a VLAN). The presence of a VAP or, in some examples, and active VAP, may be indicative that a client device is connected to a particular network device using a VLAN enabled on the network device, or one of the VLANs enabled on the network device. This may act as a further indicator that a particular VLAN is a user VLAN, rather than a non-user VLAN. Once it has been determined (at block 302) which of the identified VLANs have an accessible virtual access point, the virtual network probing (block 208) may be performed in respect of the respective VLANs in response to determining that the respective VLAN has an accessible virtual access point. Thus, network devices may be probed just on those virtual networks which are enabled on all of the network devices in the cluster and on which a virtual access point is accessible. In this way, probing is done just on those networks which are in use by client devices (i.e. user VLANs). Referring to the example discussed above, the ESSID "alpha-wpa2" may be assigned with VLAN 10 and 20 and, therefore, VLANs 10 and 20 would both be added to the probing list as they are both identified as user VLANs; in this example, both VLANs are enabled on all of the network devices in the cluster, and VAPs are accessible on both VLANs.

Following the virtual network probing (at block 208), regardless of whether or not the probing is performed in respect of just those identified virtual networks which have an accessible virtual access point, the method 300 may proceed to either block 304 or block 306. By default, the cluster of network devices is treated as (identified as) being layer 3-connected. Layer 3 (or L3) refers to connectivity via the network layer, in which data may be transferred between nodes or devices (e.g. network controllers) in the same network, or in different networks, using variable-length network packets, which are routed through routers. If it can be determined from the probing that all of the virtual networks used by client devices (e.g. the user VLANs) are enabled on each network device in the cluster, then the network device cluster may be identified as layer 2-connected. As noted above, layer 2 (or L2) refers to the connectivity via the data link layer, in which data may be transferred between adjacent network nodes in the same wide area network (WAN) or between nodes in the same local area network (LAN) or VLAN.

At block 304, the method 300 may comprise, upon determining, in response to said probing, that the set of network devices is accessible on the respective VLAN, identifying the cluster of network devices as being connected via a data link layer network protocol. In other words, if it is determined that all of the network devices in the cluster are accessible on the user VLANs, then it may be determined that the cluster is layer 2 (i.e. L2) connected. Network devices (e.g. network controllers) which are connected according to the data link layer protocol are able to failover to backup or reserve network devices in the same cluster. In this way, a client device which is connected to an L2-connected first network device can be seamlessly switched to a second network device in the cluster in the event of the first network device failing in some way (e.g. experiencing a power outage). When failover takes place in an L2-connected cluster, a client device is not de-authenticated from the first network device and should not, therefore, have to go through an authentication process with the second network device. From the point of the view of the client device, there may be little or no loss of connection during the failover, so switching to the second network device may appear seamless.

At block 306, the method 300 may comprise, upon determining, in response to said probing, that a network device in set of network devices is not accessible on the respective VLAN, identifying the cluster of network devices as being connected via a network layer network protocol. In other words, if it is determined that not all of the network devices in the cluster are accessible on the user VLANs, then it may be determined that the cluster is layer 3 (i.e. L3) connected. For example, since the default for the cluster is L3-connectivity, the identifying of block 306 may comprise leaving the cluster as L3-connected, and not identifying it as L2-connected. Network devices (e.g. network controllers) which are connected according to the network layer protocol are not able to perform a seamless failover to backup or reserve network devices in the same cluster. Thus, in the event of an L3-connected first network device failing in some way (e.g. experiencing a power outage) a client device which is connected to the first network device would be de-authenticated from the first network device and would have to go through an authentication process with the second network device for connection to the cluster to be re-established.

According to a further aspect, a network device is disclosed. The network device may, for example, comprise a network controller, such as one of the network controllers 102, 104, 106, 108. The network device comprises a processor. The processor is to perform functions relating to the blocks of the method 200, 300 disclosed herein. In some examples, the processor is to identify any virtual local area networks (VLANs) that are enabled on the network device; acquire details of any connected devices which, together with the network device, form a network device cluster; for each identified VLAN, identify those network devices in the network device cluster that are accessible on a respective VLAN; and probe the respective VLAN in response to the respective VLAN being accessible by each network device in the network device cluster. In this context, a connected device may be considered to comprise a further network device connected to the network device.

In some examples, the processor may be to determine whether a virtual access point is accessible on any of the virtual networks enabled on the network device. The processor may be to probe each connected device in the cluster of network devices in respect of those virtual networks which are enabled on all of the devices in the cluster of network devices and on which a virtual access point is accessible.

Figure 4:
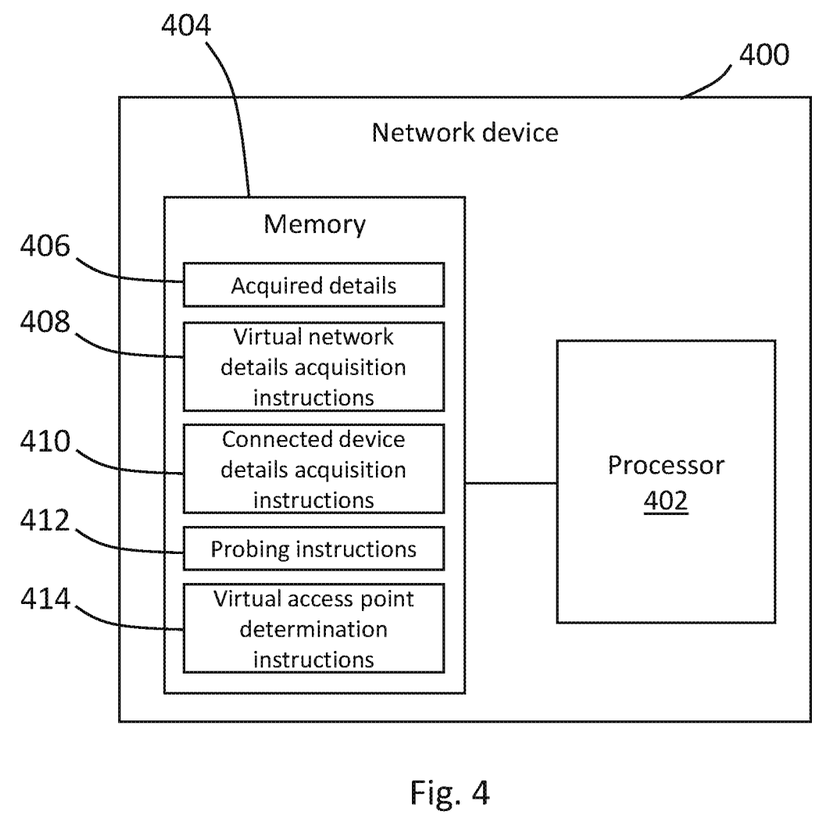
FIG. 4 is a schematic representation of an example of a network device.

The functions to be performed by the processor may, in some examples, be defined in a set of instructions stored on a memory and executable by the processor. FIG. 4 is a schematic representation of a further example of a network device 400. The network device 400 comprises processor 402. The network device 400 may further comprise a memory 404 to store at least the acquired details 406. The memory 404 may store other data. For example, in some examples, the memory 404 may store the probing list, once established.

In the example shown in FIG. 4, the memory 404 may comprise computer-readable instructions. The processor may execute instructions stored in the memory. For example, the memory 404 may comprise virtual network details acquisition instructions 408 to acquire details of any virtual networks enabled on the network device, connected device details acquisition instructions 410 to acquire details of any connected devices which, together with the network device, form a cluster of network devices, and probing instructions 412 to probe each connected device in the cluster of network devices in respect of those virtual networks enabled on all of the devices in the cluster of network devices. It will be appreciated that the network device 400 may include other features, for example to enable receiving functionality and transmission functionality, so that data can be transmitted from and received by the network device, for example from a master controller (FIG. 1, 110).

The processor 402 of the network device 400 may, in some examples, be to determine whether any of the VLANs enabled on the network device have an accessible virtual access point. In this way, the network device can determine that it is in use by a client device which is active on a user virtual network (e.g. a user VLAN). The processor 402 may be to probe the respective VLAN in response to the respective VLAN being accessible by each network device in the network device cluster and in response to determining that a virtual access point is accessible on the respective VLAN. Thus, the memory 404 of the network device 400 may comprise virtual access point determination instructions 414 to determine whether any of the virtual networks enabled on the network device have an accessible virtual access point.

Probing by the network device 400 may be performed using techniques discussed herein. In some examples, the processor 402 may be to probe the respective VLAN by transmitting a data packet from the network device to each of the connected devices in the network device cluster on the respective VLAN. If the network device 400 receives a response data packet from a connected device in the cluster of network devices on a particular virtual network, then the network device can determine that the connected device from which the response was received is accessible on that particular virtual network.

Figure 5:
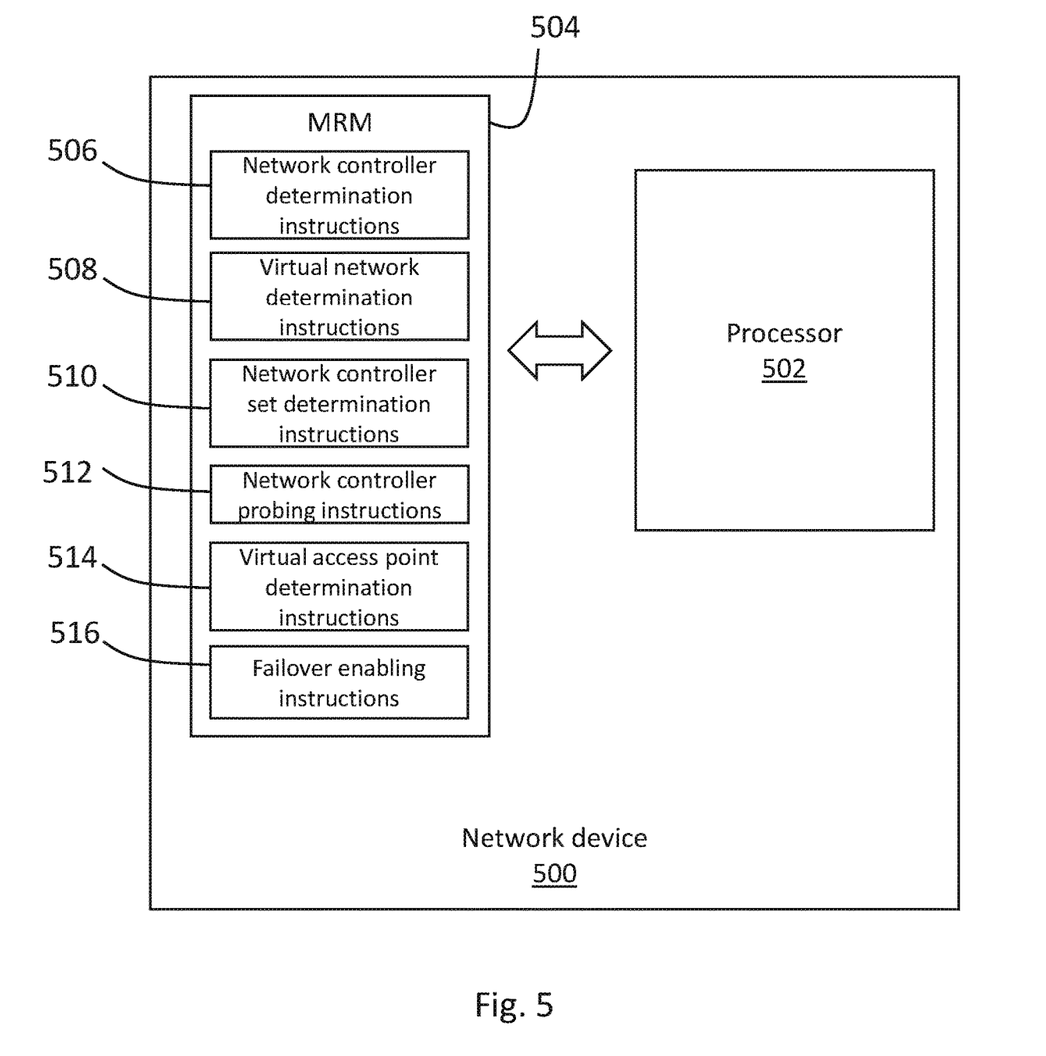
FIG. 5 is a schematic representation of an example of a network device having a machine-readable medium and a processor.

According to a further aspect, the present disclosure may relate to a machine-readable medium. FIG. 5 is a schematic representation of a network device 500 having a processor 502 connected to a non-transitory machine-readable medium 504. The non-transitory machine-readable medium 504 comprises instructions which, when executed by the processor 502, cause the processor to perform functions of the methods 200, 300 disclosed herein. In one example, the machine-readable medium 504 comprises instructions which, when executed by the processor 502, cause the processor to determine that a plurality of network controllers form a cluster of network controllers. Thus, the instructions may, in some examples, comprise network controller determination instructions 506. The machine-readable medium 504 may comprise instructions which, when executed by the processor 502, cause the processor to determine the identity of virtual local area networks (VLANs) that are enabled on each of the plurality of network controllers in the cluster of network controllers. Thus, the instructions may, in some examples, comprise virtual network determination instructions 508. The machine-readable medium 504 may comprise instructions which, when executed by the processor 502, cause the processor to, for each identified VLAN, determine a set of network controllers accessible on a respective VLAN. Thus, the instructions may, in some examples, comprise network controller set determination instructions 510. The machine-readable medium 504 may comprise instructions which, when executed by the processor 502, cause the processor to cause a first network controller in the cluster of network controllers to probe the respective VLAN in response to the respective VLAN being accessible by each network controller in the cluster of network controller. Thus, the instructions may, in some examples, comprise network controller probing instructions 512.

In some examples, the non-transitory machine-readable medium 504 may comprise instructions which, when executed by the processor 502, cause the processor to determine whether a virtual access point is accessible on any of the identified VLANs. Thus, the instructions may, in some examples, comprise virtual access point determination instructions 514. The first network controller may be caused to probe each other network controller in the cluster of network controllers in respect of each of the identified virtual networks which has an accessible virtual access point.

In some examples, in order to cause the first network controller to probe the respective VLAN, the non-transitory machine-readable medium 504 may comprise instructions which, when executed by the processor 502, cause the processor to transmit a data packet from the first network controller to each other network controller in the cluster of network controller; and receive a response from those network controllers in the cluster of network controllers on which the respective VLAN is enabled.

The non-transitory machine-readable medium 504 may, in some examples, comprise instructions which, when executed by the processor 502, cause the processor, upon determining that the set of network controllers is accessible on the respective VLAN, to identify the cluster of network controllers as being connected via a data link layer network protocol. In other examples, the non-transitory machine-readable medium 504 may comprise instructions which, when executed by the processor 502, cause the processor, upon determining that a network controller in the set of network controllers is not accessible on the respective VLAN, to identify the cluster of network controllers as being connected via a network layer network protocol.

The non-transitory machine-readable medium 504 may, in some examples, comprise instructions which, when executed by the processor 502, cause the processor, upon determining that the set of network controllers is accessible on the respective VLAN, to enable failover of an authenticated client device connected to the first network controller to a second network controller in the cluster of network controllers without de-authenticating the client device. Thus, the instructions may, in some examples, comprise failover enabling instructions 514. As discussed above, failover of an authenticated client device to a second network controller without de-authenticating the client device from the first network controller is possible when the network controllers are connected according to the data link protocol (i.e. layer 2), but not when the network controllers are connected according to the network protocol (i.e. layer 3). Thus, once it has been determined which VLANs are enabled on all of the network devices or network controllers in a cluster, probing of the network controllers may be carried out just on those determined VLANs. Non-user VLANs which are enabled on network controllers in the network controller cluster will not be probed and, therefore, the cluster will not be determined to be L3-connected.

In order to determine that a plurality of network controllers form a cluster of network controllers (e.g. using the instructions 506), the non-transitory machine-readable medium 504 may, in some examples, comprise instructions which, when executed by the processor 502, cause the processor to receive at each network controller in the plurality of network controllers, configuration settings from a cluster management device.

Examples described herein provide a mechanism by which probing of network controllers within a network controller cluster may be performed just in respect of those virtual networks (e.g. VLANs) which are determined to be enabled on all of the network controllers in the cluster. Such VLANs may be considered to be user VLANs as these are the virtual networks used by client devices. In some examples discussed herein, probing of the network controllers may be performed just in respect of those virtual networks on which a virtual access point (VAP) is also determined to be accessible. The presence of an active VAP in a VLAN provides further confirmation that a particular VLAN is in use by a client device. By performing the probing in the manner disclosed herein, probing will be performed just on those VLANs which are considered appropriate, because failover impacts just the client devices. Furthermore, the addition of a non-user VLAN (e.g. the VLANs 30 to 90 in FIG. 1) in respect of one of the network controllers in the cluster will not cause the entire cluster to be treated as though it were L3-connected. Any additional non-user VLAN will effectively be ignored for the purpose of probing. In that way, any connected client devices may still benefit from a seamless failover procedure.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   identifying a plurality of network devices in a cluster of network devices;
   identifying any virtual local area networks (VLANs) that are enabled on each of the plurality of network devices in the cluster of network devices;
   determining which of the identified VLANs have an accessible virtual access point;
   for each identified VLAN that is enabled on each of the plurality of network devices and that has an accessible virtual access point, determining a set of network devices that are accessible on a respective VLAN; and
   upon determining that each network device of the cluster of network devices is accessible on a respective VLAN:
      probing the respective VLAN,
      upon determining, in response to said probing, that each network device in the cluster of network devices is accessible on the respective VLAN, identifying the cluster of network devices as being connected via a data link layer network protocol, and
      upon determining, in response to said probing, that one or more network devices in the cluster of network devices is not accessible on the respective VLAN, identifying the cluster of network devices as being connected via a network layer network protocol.

2. The method according to claim 1, wherein the VLAN probing comprises, on the respective VLAN:
   transmitting a data packet from a first network device in the cluster of network devices to each other network device in the cluster of network devices; and
   receiving a response from those network devices in the cluster of network devices on which the respective VLAN is enabled.

3. The method according to claim 1, wherein identifying the plurality of network devices comprises receiving at each network device in the plurality of network devices, configuration settings from a cluster management device.

4. A network device comprising:
   a memory;
   a processor executing instructions stored in the memory to:
      identify any virtual local area networks (VLANs) that are enabled on the network device;
      acquire details of any connected devices which, together with the network device, form a network device cluster, including:
         identifying a plurality of network devices in the network device cluster,
         identifying any VLANs that are enabled on each of the plurality of network devices in the network device cluster, and
         determining which of the identified VLANs have an accessible virtual access point;
      for each identified VLAN that is enabled on each of the plurality of network devices and that has an accessible virtual access point, identify those network devices in the network device cluster that are accessible on a respective VLAN; and
      upon determining that each network device of the cluster of network devices is accessible on a respective LAN:
         probe the respective VLAN,
         upon determining, in response to said probing, that each network device in the cluster of network devices is accessible on the respective VLAN, identifying the cluster of network devices as being connected via a data link layer network protocol, and
         upon determining, in response to said probing, that one or more network devices in the cluster of network devices is not accessible on the respective VLAN, identifying the cluster of network devices as being connected via a network layer network protocol.

5. The network device according to claim 4, wherein the processor is to probe the respective VLAN by transmitting a data packet from the network device to each of the connected devices in the network device cluster on the respective VLAN.

6. The network device according to claim 4, wherein the network device comprises a network controller.

7. A non-transitory machine-readable medium comprising instructions that, when executed by a processor, cause the processor to:
   determine that a plurality of network controllers form a cluster of network controllers;
   identity virtual local area networks (VLANs) that are enabled on each of the plurality of network controllers in the cluster of network controllers;
   determine which of the identified VLANs have an accessible virtual access point;
   for each identified VLAN that is enabled on each of the plurality of network controllers and that has an accessible virtual access point, determine a set of network controllers accessible on a respective VLAN; and
   upon determining that each network controller of the cluster of network controllers is accessible on a respective LAN:
      cause a first network controller in the cluster of network controllers to probe the respective VLAN,
      upon determining, in response to said probing, that each network controller in the cluster of network controllers is accessible on the respective VLAN, identifying the cluster of network controllers as being connected via a data link layer network protocol, and
      upon determining, in response to said probing, that one or more network controllers in cluster of network controllers is not accessible on the respective VLAN, identifying the cluster of network controllers as being connected via a network layer network protocol.

8. The non-transitory machine-readable medium according to claim 7, wherein, in order to cause the first network controller to probe the respective VLAN, the machine-readable medium further comprises instructions that, when executed by the processor, cause the processor to:
   transmit a data packet from the first network controller to each other network controller in the cluster of network controller; and
   receive a response from those network controllers in the cluster of network controllers on which the respective VLAN is enabled.

9. The non-transitory machine-readable medium according to claim 7, further comprising instructions that, when executed by a processor, cause the processor to:
   upon identifying the cluster of network controllers as being connected via a data link layer network protocol, enable failover of an authenticated client device connected to the first network controller to a second network controller in the cluster of network controllers without de-authenticating the client device; and
   upon identifying the cluster of network controllers as being connected via a network layer network protocol, requiring an authenticated device connected to the first network controller upon failure to de-authenticate and perform an authentication process to re-establish a connection with the second network controller.

10. The non-transitory machine-readable medium according to claim 7, wherein, in order to determine that a plurality of network controllers form a cluster of network controllers, the machine-readable medium comprises instructions which, when executed by a processor, cause the processor to:
    receive at each network controller in the plurality of network controllers, configuration settings from a cluster management device.

11. The method according to claim 1, further comprising:
    upon identifying the cluster of network devices as being connected via a data link layer network protocol, enabling failover of an authenticated client device connected to a first network device to a second network device in the cluster of network devices without de-authenticating the client device; and
    upon identifying the cluster of network devices as being connected via a network layer network protocol, requiring an authenticated device connected to the first network device upon failure to de-authenticate and perform an authentication process to re-establish a connection with the second network device.

12. The network device according to claim 4, wherein the instructions stored in the memory further include the process to:
    upon identifying the cluster of network devices as being connected via a data link layer network protocol, enable failover of an authenticated client device connected to a first network device to a second network device in the cluster of network devices without de-authenticating the client device; and
    upon identifying the cluster of network devices as being connected via a network layer network protocol, require an authenticated device connected to the first network device upon failure to de-authenticate and perform an authentication process to re-establish a connection with the second network device.

* * * * *